Patented May 5, 1936

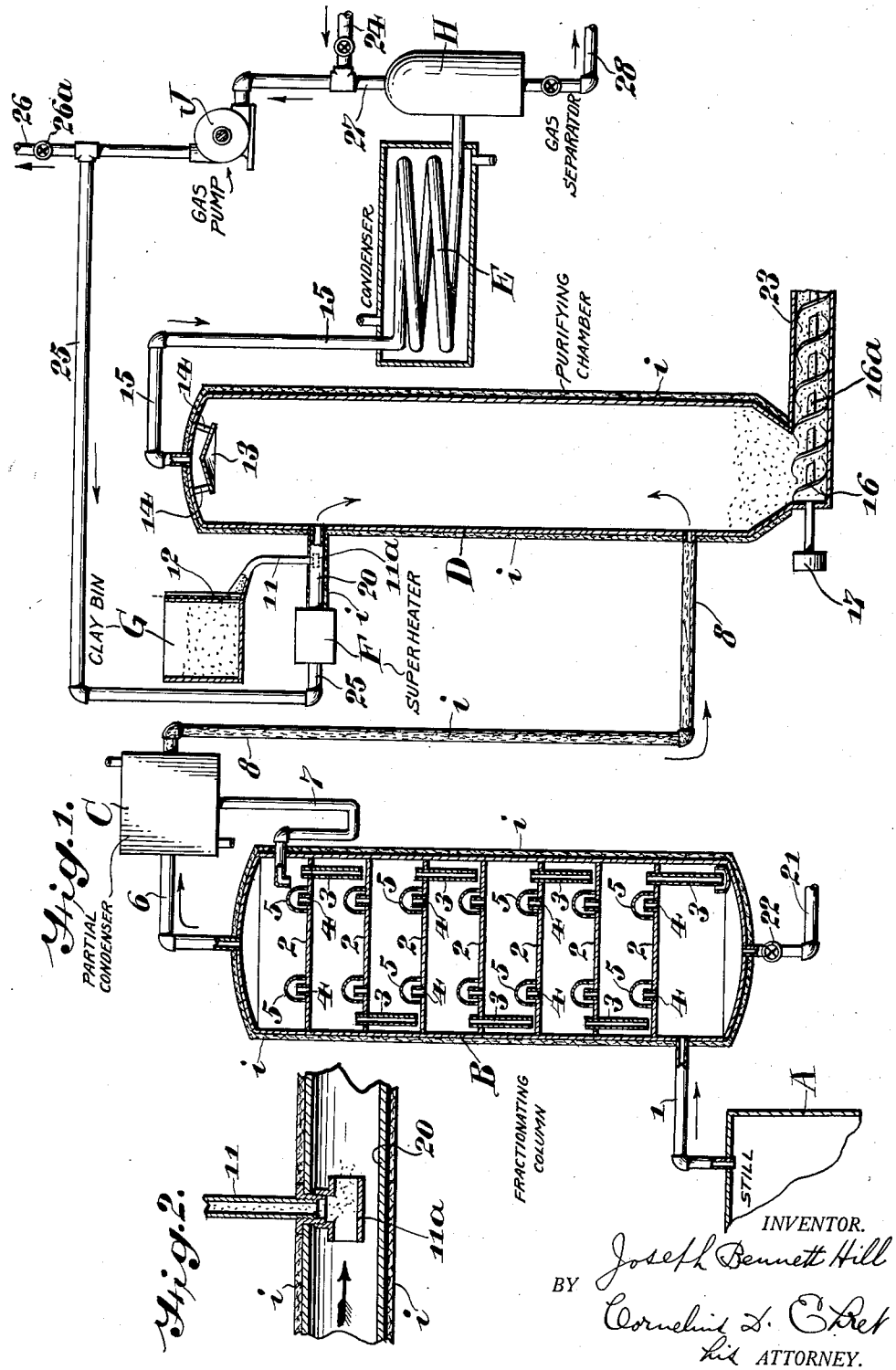

2,039,904

UNITED STATES PATENT OFFICE 2,039,904

REFINING OF MINERAL OIL DISTILLATES

Joseph Bennett Hill, Philadelphia, Pa., assignor, by mesne assignments, to The Gray Processes Corporation, Newark, N. J., a corporation of Delaware Application June 21, 1926, Serial No. 117,223
Renewed December 6, 1933

6 Claims. (Cl. 196—96)

My invention relates to the refining of distillates of mineral oils including gasoline, lamp oil and other petroleum products with particular reference to naphthas formed by cracking of oils of higher boiling points.

In accordance with my invention the undesirable gum-forming and color-imparting bodies are removed from naphthas and other mineral oils.

More particularly in accordance with my invention the distillates are refined by passing their vapors upwardly through a chamber in which they are brought into intimate contact with a descending stream of finely divided catalytic material such as fuller's earth, which is delivered in substantially dry form into the top of the chamber.

Mineral oils, as naphthas and gasoline, particularly those formed by cracking higher boiling gas oils, fuel oils, etc., contain undesirable color-imparting and gum-forming compounds which cause a disagreeable color and odor and may deposit tarry resinous material in storage tanks or in the carburetor of internal combustion engines. These undesirable compounds are largely unsaturated hydrocarbons, such, for example, as diolefines.

Various methods have been used for removal of such compounds, the most common of which is treatment with sulphuric acid, followed by neutralization and redistillation. Aside from the cost of the chemicals and redistillation, this method is unsatisfactory due to the high losses resulting from the reaction of sulphuric acid with other unsaturated materials, as olefines, which may not have a deleterious effect upon the oil under treatment, but on the other hand, in the case of motor fuel are desirable constituents due to their ability to withstand higher compression in an internal combustion engine without detonation than the saturated compounds.

It is an object of my invention to remove these objectionable compounds in a continuous process using a relatively cheap highly efficient refining agent without materially altering the other unsatured compounds which may be present. My preferred material is finely divided fuller's earth about 100 mesh or finer, although I may use any other substance, such as bauxite or carbon, capable of removing gum-forming and/or color-imparting bodies.

Fuller's earth and equivalent catalytic materials when brought into contact with hydrocarbon vapors containing these undesirable compounds effects their removal probably by polymerization of these relatively unstable compounds with the formation of relatively high boiling compounds which may be adsorbed on the surface of the catalyst.

In accordance with my invention, I pass the vapors of the oil to be refined upwardly through a chamber and at the same time introduce the catalyst, as clay or fuller's earth, in a finely divided pulverant form at the top of the chamber so as to cause it to settle down through the ascending vapor. The velocity of the vapors passing upwardly through the chamber may be sufficiently high and so regulated that the settling rate of the clay will be relatively slow thus affording sufficient time for reaction with the vapors. In this way counter-current treatment is effected, whereby the untreated vapors are brought into contact with the partially spent refining agent while the final purifying of the vapors is brought about by contact with fresh solid material. The clay which accumulates in the bottom of the chamber may be removed by any suitable means, as, for example, by an Archimedean screw.

One form of my invention and one type of apparatus suitable for carrying it out will be described with reference to the attached drawing in which Fig. 1 is an elevational and sectional view of the apparatus; and Fig. 2 is a detail showing a method of introduction of the solid refining agent.

A, representing a source of hydrocarbon vapors, such as a cracking still, is connected by the pipe 1 to the lower end of the fractionating column B which may be provided with suitable fractionating equipment; for example, the bubbler plates 2 carrying downflow pipes 3 and vapor uptakes 4 covered by bubbler caps 5. From the top of the fractionating column the vapor line 6 leads to the partial condenser C. The trapped line 7 leads from the condenser C to the top of the fractionating column where it discharges condensate onto the uppermost plate 2. The vapor line 8 leads from the partial condenser C to the lower end of the treating chamber D. From the top of the treating chamber extends the vapor line 15 which leads to a condenser E from which liquid and uncondensed vapors and gas pass to the separator H. The line 27 leads from the gas separator H to the pump J from which the line 25 leads to the superheater F. The lines 24 and 26 are connected to the lines 27 and 25 respectively. From the superheater the line 20 leads to the purifying chamber D and is connected therewith at a point somewhat below the top. Leading from the bin G is the pipe 11 which is connected with the T fitting 11a within the line 20 as shown in detail in Fig. 2, discharge being controlled by the valve or gate 12.

The purifying chamber D is a relatively tall vertical cylinder. Below the point at which the vapor line 15 is connected to the purifying chamber D is placed a baffle 13 suspended by the supports 14. Mounted in the lower end of the treating chamber D is a screw 16, the shaft 16a of which extends outside the chamber and is provided with pulley 17 which may be driven by any suitable source of power. The lower end of the chamber D is sloped inwardly to form a long narrow section which is extended beyond the bottom of the chamber at the end opposite the pulley to form the discharge 23. It is desirable that the apparatus, particularly the treating chamber D, be covered with heat insulating material 1.

In the operation of the process oil may be cracked in the still A, or oil previously cracked may be redistilled therein and the vapors passed through the line 1 to the lower end of the fractionating column B through which they rise, counter-current to a descending stream of reflux liquid and in bubbling through this liquid on the plates 2 fractionation is effected, as a result of which the vapors leaving the top of the column B through the vapor line 6, constitute the lowest boiling constituents of the vapor introduced through the line 1. The reflux liquid which passes downwardly through the column is drawn off at the bottom through the line 21 controlled by valve 22 and is passed to storage or is returned to the still for further treatment.

The vapors leaving the top of the column through the line 6 pass to the partial condenser C which may be cooled by any suitable means and the condensate which forms therein constitutes the reflux liquid for the fractionating column and is returned to the uppermost plate through the trapped line 7. The vapors which are not condensed in the partial condenser pass through the line 8, and are introduced into the treating chamber D at a point near its lower end.

Uncondensed vapors or gas from the cracking process, or from other source, may be utilized for the feeding of the fuller's earth into the top of the treating chamber. Gas may be introduced through the line 24 or from the top of the gas separator H into the line 25 and is forced by the pump J through the superheater F where it is heated to a temperature equal to or greater than that of the vapors introduced into the treating chamber. The heated gas passes from the superheater through the line 20 into which is fed clay, from the bin G, through the line 11, controlled by the valve or gate 12, into the nozzle 11a. The gas is passed through the member 11a and line 20 at such speed that it carries with it the finely divided solid and introduces it through pipe 20 into the top of the column D. The superheating is only for the purpose of insuring that the gas or other transporting medium and clay shall be at or above the temperature of the vapors in the treating chamber D, thereby preventing condensation of the vapors.

Gas from an external source may be used to start the operation but after the system is in operation the gas produced by the cracking is preferably used. If this quantity is insufficient it may be augmented by gas from the line 24 and if too large a quantity is formed in the cracking process, a portion may be bled from the system through the line 26 controlled by the valve 26a.

Upon discharge into the treating chamber D, the particles of fuller's earth tend to fall to the bottom but the vapors introduced at the lower end of the chamber D oppose the settling of the fine clay particles and thus retard the descent. The rising vapors which contain undesirable gum-forming and color-imparting bodies upon contact with the finely divided fuller's earth are purified by the removal of these objectionable compounds. The mechanism of this process is apparently one of polymerization in which the fuller's earth acts as a catalyst which causes the diolefines or like bodies to form higher boiling compounds which are condensed to liquid and adsorbed on the surface of the fuller's earth. The vapors in passing upwardly through the column are subjected to fuller's earth of increasing degree of activity, the final contact being with fresh fuller's earth discharged into the chamber with the superheated vapors. A space is provided above the point at which the line 20 discharges into the chamber to permit settling out of the fuller's earth from the purified vapor and, to further insure the removal of finely divided solid, a baffle 13 is placed below the point at which the vapor discharge line 15 is connected to the chamber D. The purified vapors thus freed from the solid leave the chamber through the line 15 and pass to condenser E which delivers to separator H from which condensate is drawn off through pipe 28, and gas and vapor through pipe 27. If desired, the portion of the chamber D above the point at which the line 20 is connected may be increased in size to provide a greater cross-sectional area which will decrease the vapor velocity and allow additional settling of fuller's earth.

The catalytic material which settles to the bottom of the chamber D is removed therefrom by means of the screw 16 which carries the solid through the extension 23 from which it is discharged and then transported to a reactivation system, or may be discarded.

By regulating the velocity of the vapors in the chamber D the rate of settling of the fuller's earth may be controlled to such an extent as to permit a sufficient time of contact to effect the desired purification.

If desired, the fractionating column B may be omitted or may follow the treating chamber D in either of which cases the line 1 will be connected directly to the lower end of the treating chamber D.

Mechanical sifter or other means may be utilized for introducing the fuller's earth to the chamber D in place of the method described.

While fuller's earth has been referred to as the treating material, any solid adsorptive material capable of selectively polymerizing objectionable unstable unsaturated constituents of cracked hydrocarbons which tend to discolor on exposure to light and to form deposits may be used.

What I claim is:

1. The method of removing gum-forming and color-imparting bodies from mineral oil distillates containing unsaturated compounds, which comprises introducing vapors of the distillate into a treating zone, bringing into direct contact with said vapors in said zone particles of dry finely divided fuller's earth in motion, separating gas from said vapors, and utilizing gas so separated as motive fluid for transporting particles of fuller's earth to said zone.

2. The method of removing gum-forming and color-imparting bodies from mineral oil distillates containing unsaturated compounds, which comprises introducing vapors of the distillates into a treating zone, introducing dry finely divided fuller's earth into said zone, effecting fall of particles of the fuller's earth through said vapors countercurrent to and in direct contact therewith, separating gas from said vapors, and utilizing gas so separated as motive fluid for transporting particles of fuller's earth to said zone.

3. The method of refining petroleum products containing unstable hydrocarbon compounds which comprises introducing the same in vapor phase into a treating zone, introducing finely divided solid adsorptive material into said zone, effecting fall of particles of solid adsorptive material through the vapor countercurrent thereto and in direct contact therewith, separating gas from the vapor and utilizing gas so separated as motive fluid for transporting particles of adsorptive material to said zone.

4. The method of refining petroleum products containing unstable hydrocarbon compounds which comprises introducing the same in vapor phase into a treating zone, introducing finely divided solid adsorptive material into said zone, effecting fall of particles of solid adsorptive material through the vapor countercurrent thereto and in direct contact therewith, separately withdrawing the treated vapor and spent adsorptive material, condensing the vapor and separating gas from the condensate thereby obtained and utilizing gas so separated as motive fluid for transporting particles of adsorptive material to said zone.

5. The method of refining petroleum products containing unstable unsaturated hydrocarbon impurities which comprises passing the same through an interiorly unobstructed treating chamber, while simultaneously introducing finely divided solid adsorptive material into said chamber and causing particles of the adsorptive material to fall through the free space within said chamber in countercurrent to the flow of said vapors and in direct contact therewith.

6. The method of refining petroleum products containing unstable unsaturated hydrocarbon impurities which comprises passing the same through an interiorly unobstructed treating chamber, while simultaneously introducing finely divided solid adsorptive material into said chamber and causing particles of the adsorptive material to fall through the free space within said chamber in countercurrent to the flow of said vapors and in direct contact therewith, removing from the bottom of said chamber particles of said adsorptive material which have settled out of suspension in said vapors and separately removing the treated vapors.

JOSEPH BENNETT HILL.